(12) United States Patent
Mukhopadhyay et al.

(10) Patent No.: US 9,305,204 B2
(45) Date of Patent: Apr. 5, 2016

(54) METHOD AND SYSTEM TO DETECT THE MICROCALCIFICATIONS IN X-RAY IMAGES USING NONLINEAR ENERGY OPERATOR

(75) Inventors: Sudipta Mukhopadhyay, Kharagpur (IN); Subhendu Seth, Kharagpur (IN)

(73) Assignee: INDIAN INSTITUTE OF TECHNOLOGY, KHARAGPUR, Kharagpur, West Bengal (IN)

( * ) Notice: Subject to any disclaimer, the term of this patent is extended or adjusted under 35 U.S.C. 154(b) by 359 days.

(21) Appl. No.: 13/991,692

(22) PCT Filed: Dec. 5, 2011

(86) PCT No.: PCT/IN2011/000824
§ 371 (c)(1),
(2), (4) Date: Jun. 5, 2013

(87) PCT Pub. No.: WO2012/077130
PCT Pub. Date: Jun. 14, 2012

(65) Prior Publication Data
US 2013/0251207 A1    Sep. 26, 2013

(30) Foreign Application Priority Data
Dec. 6, 2010 (IN) .......................... 1372/KOL/2010

(51) Int. Cl.
*G06K 9/00* (2006.01)
*G06T 7/00* (2006.01)

(52) U.S. Cl.
CPC .......... *G06K 9/00127* (2013.01); *G06T 7/0012* (2013.01); *G06T 2207/10116* (2013.01); *G06T 2207/30068* (2013.01)

(58) Field of Classification Search
None
See application file for complete search history.

(56) References Cited

U.S. PATENT DOCUMENTS

| 4,907,156 A | 3/1990 | Doi et al. |
| 5,598,481 A * | 1/1997 | Nishikawa ............. G06K 9/527 128/925 |

(Continued)

OTHER PUBLICATIONS

International Search Report dated Mar. 26, 2012 for related PCT App. No. PCT/IN2011/000824.

(Continued)

*Primary Examiner* — Tsung-Yin Tsai
(74) *Attorney, Agent, or Firm* — D'Ambrosio & Menon, PLLC; Usha Menon

(57) ABSTRACT

A method and system to detect the microcalcifications (MC) in different type of images viz. X-ray images/mammograms/computer tomography with varied densities using nonlinear energy operator (NEO) is disclosed to favor precise detection of early breast cancer. Such Microcalcifications are associated with both high intensity and high frequency content. The same NEO output is useful to detect and remove the irrelevant curvilinear structures (CLS) thereby helps in reducing the false alarms in micro calcification detection technique. This is effective on different dataset (scanned film, mammograms with large spatial resolution such as CR and DR) of varied breast composition (viz. dense, fatty glandular, fatty), demonstrated quantitatively by Free-response receiver operating characteristic (FROC). Importantly, the method and apparatus of the invention can be used in conjunction with machine learning techniques viz. SVM to favor detection of incipient or small microcalcifications, thus benefiting radiologists in confirming detection of micro-calcifications in X-rays images/mammograms and reducing death rates.

8 Claims, 15 Drawing Sheets

(56) References Cited

U.S. PATENT DOCUMENTS

Figure 1:
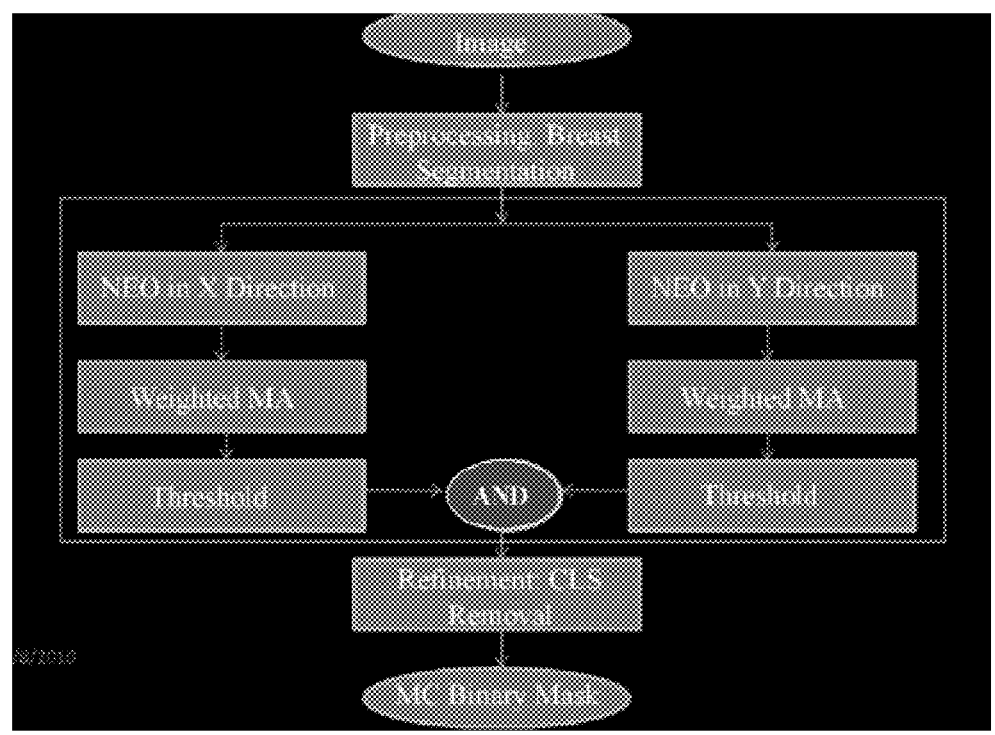

| | | | | |
|---|---|---|---|---|
| 5,999,639 | A | * | 12/1999 | Rogers ................. B25J 15/04 382/132 |
| 8,977,019 | B2 | * | 3/2015 | Chan ................. G06T 7/0012 382/128 |
| 2005/0152588 | A1 | * | 7/2005 | Yoshida ............. G06T 7/0012 382/128 |
| 2006/0147101 | A1 | * | 7/2006 | Zhang ............... G06T 7/0012 382/131 |

OTHER PUBLICATIONS

Mukhopadhyay S. et al: "A New Interpretation of Nonlinear Energy Operator and Its Efficacy in Spike Detection", IEEE Transactions on Biomedical Engineering, IEEE Service Center, Piscataway, NJ, USA, vol. 1. 45, No. 2, Feb. 1, 1998; pp. 180-187.

Cheng H. D. et al: "Computer-aided detection and classification of microcalcifications in mammograms: a survey;" Pattern Recognition, Elsevier, GB, vol. 1. 36, No. 12; Dec. 1, 2003; pp. 2967-2991.

R. M. Nishikawa, M. L. Giger, K. Doi, C. Vyborny, and R. A. Schmidt, "Computer-aided detection of clustered microcalcifications on digital mammograms", Med. Biological Eng., Computing, vol. 33, pp. 174-178. 1995.

Cheng, H, Y. M. L., and Freimanis, R.I., "A Novel Approach to Micro-calcification Detection Using Fuzzy Logic Technique," IEEE Transactions on Medical Imaging vol. 17, issue 3, pp. 442-450; 1998.

Gurcan, M. N.,Yardimci, Yasmen, and Cetin, A. E., "Micro-calcification segmentation and mammogram image enhancement using nonlinear filtering", Proceedings of the IEEE-EURASIP Workshop on Nonlinear Signal and Image Processing (NSIP'99) 1999.

Melloul, M. and Joskowicz, L. "Segmentation of micro-calcification in X-ray mammograms using entropy thresholding", Technical report, in Proceedings of the 16th International Congress on Computer-Assisted Radiology and Surgery, 2002.

Naqa, I., Yang, Y., Wernick, M. N., Galatsanos, N. P., and Nishikawa, R. M., "A Support Vector Machine Approach for Detection of Microcalcifications", IEEE Trans. on Med. Imaging, vol. 21, pp. 1552-1563; Dec. 2002.

Guan, Q., Zhang, J., s. C. and Todd-Pokropeka, A., "Automatic Segmentation of Micro-calcification Based on SIFT in Mammograms", BMEI '08: Proceedings of the 2008 International Conference on Biomedical Engineering andInfornnatics, IEEE Computer Society, Washington, DC, USA, pp. 13-17, 2008.

Mohanalin, J., P. K. K. and Kumar, N., "Micro-calcification Segmentation USing Normalized Tsallis Entropy: An Automatic "q" Calculation by Exploiting Type II Fuzzy Sets," IETE Journal of Research, vol. 55, pp. 90-96, 2009.

Jinshan, T., Rangayyan, R.M., Jun, X., El Naqa, 1., and Yongyi, Y.; "ComputerAided Detection and Diagnosis of Breast Cancer with Mammography: Recent Advances", IEEE Trans. on Information Technology in Biomedicine, pp. 236-251; 2009.

Linguraru, M. G., Marias, K., Ruth, E., and Brady, M., "A biologically inspired algorithm for micro-calcification cluster detection", Medical Image Analysis Elsevier, vol. 10, Issue 6, pp. 850-862, Dec. 2006.

* cited by examiner

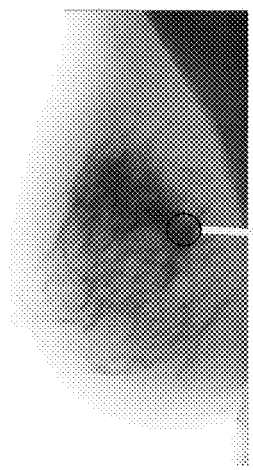
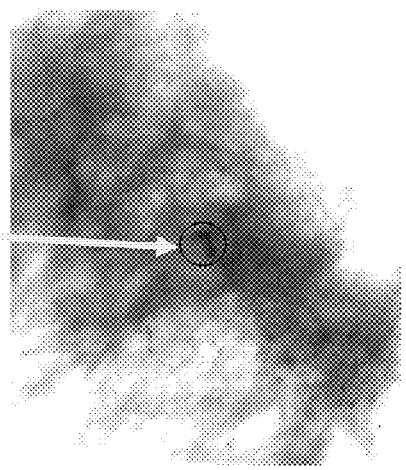
Figure 3(a)	Figure 3(b)
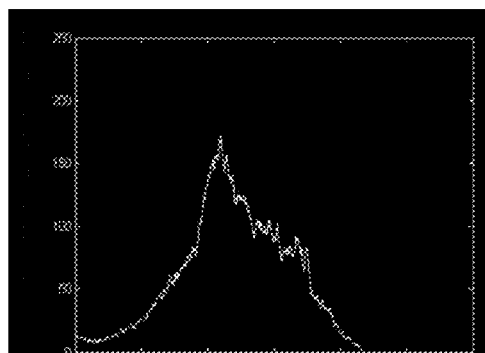
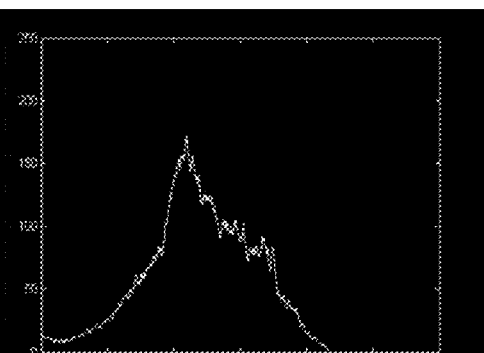
Column Direction	Row Direction
Figure 3(c)	Figure 3(d)

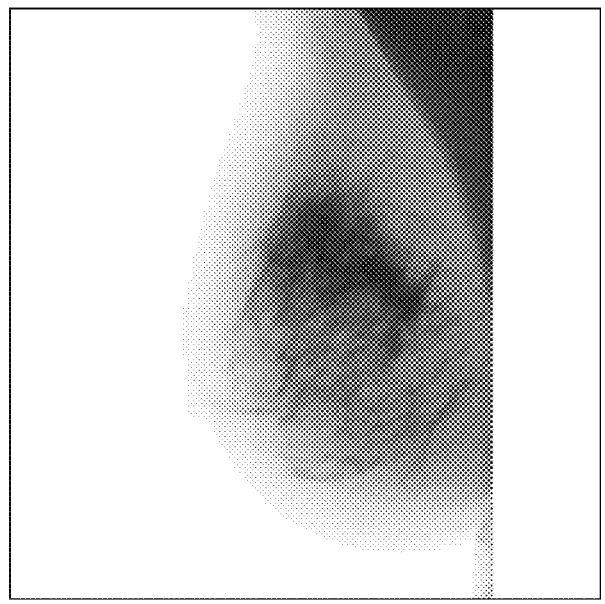
Figure 4(a)
 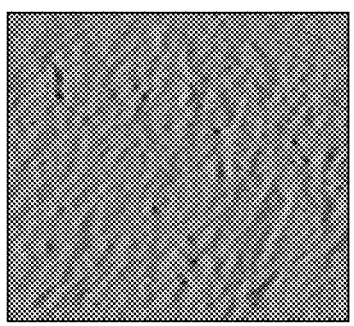 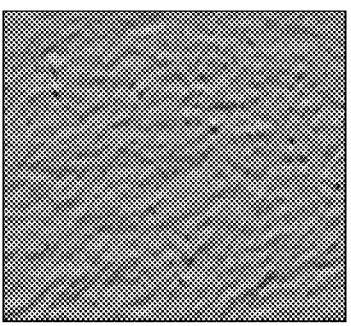
Figure 4(b)  Figure 4(c)  Figure 4(d)

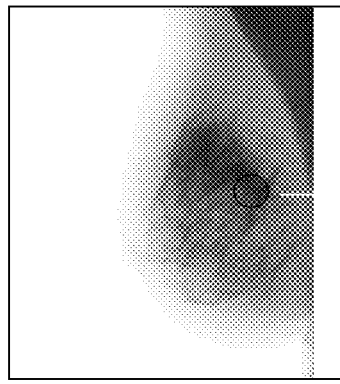
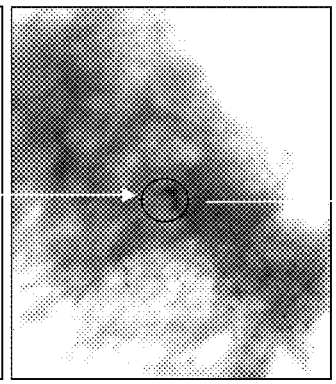
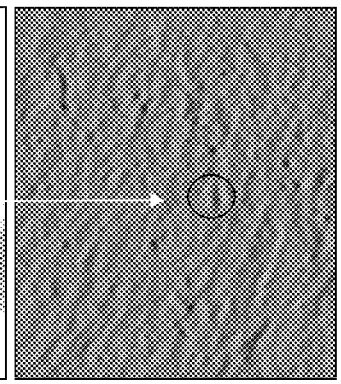
Figure 5(a)  Figure 5(b)  Figure 5(c)
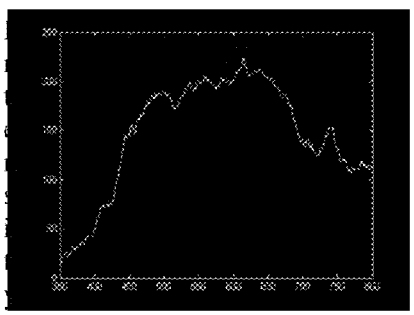
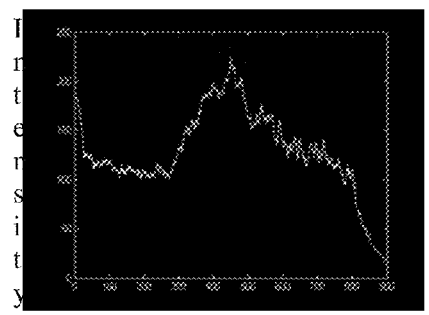
Column Direction  Row Direction
Figure 5(d)  Figure 5(e)
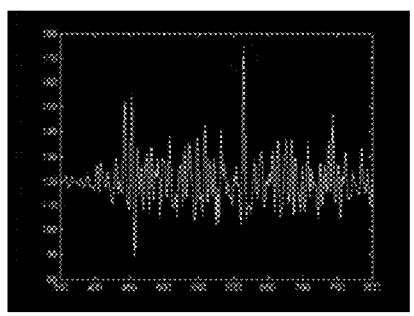
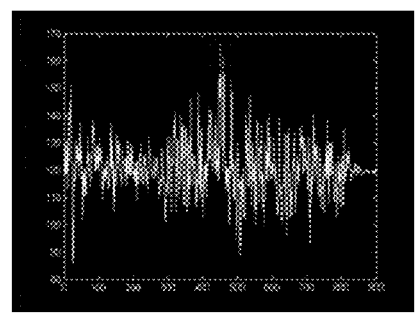
Column Direction  Row Direction
Figure 5(f)  Figure 5(g)

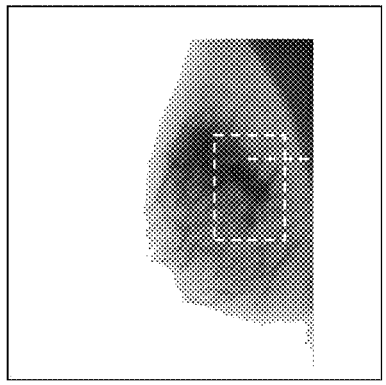  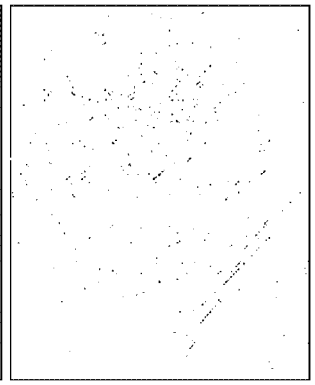
Figure 6(a)     Figure 6(b)     Figure 6(c)
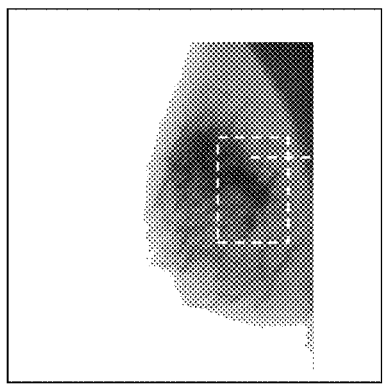  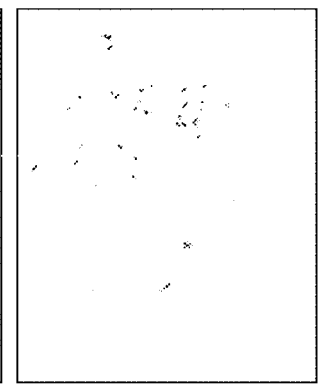
Figure 7(a)     Figure 7(b)     Figure 7(c)

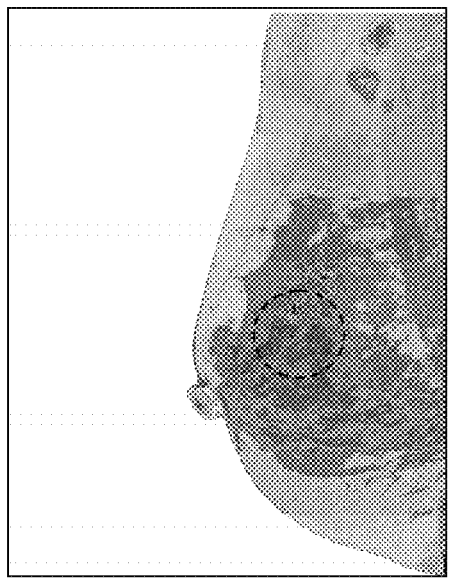 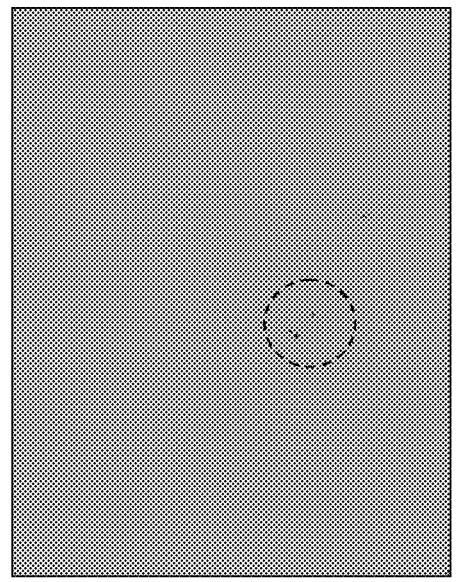
Figure 8(a)  Figure 8(b)
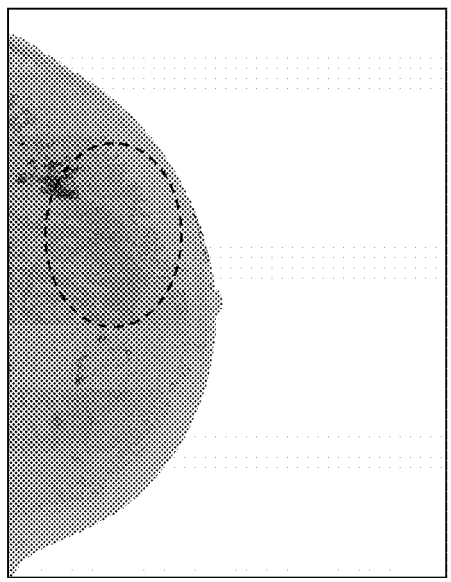 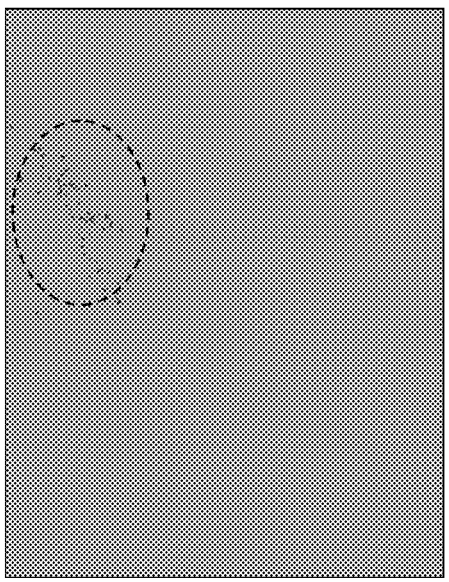
Figure 8(c)  Figure 8(d)

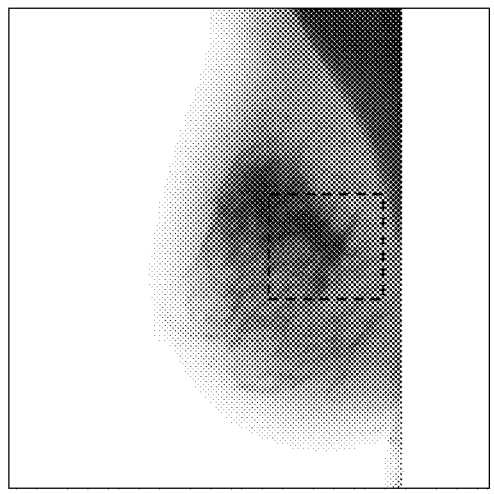
Figure 10(a)
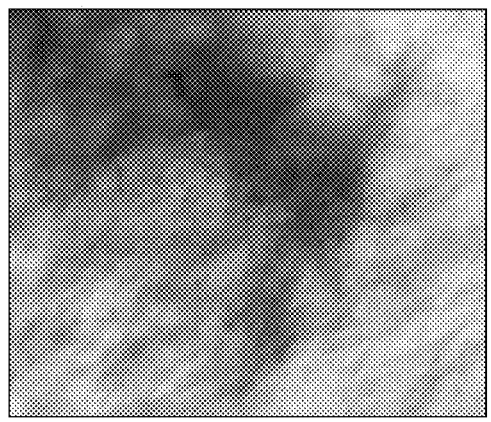 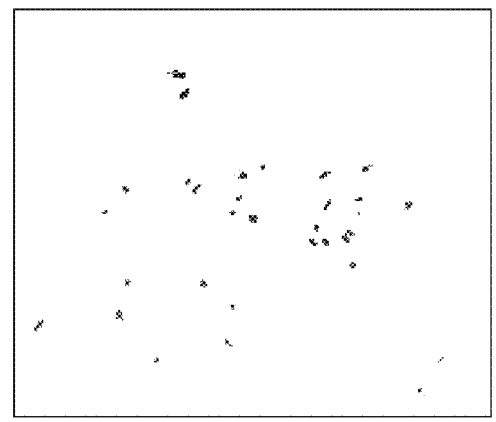
Figure 10(b)　　　　　　　　Figure 10(c)

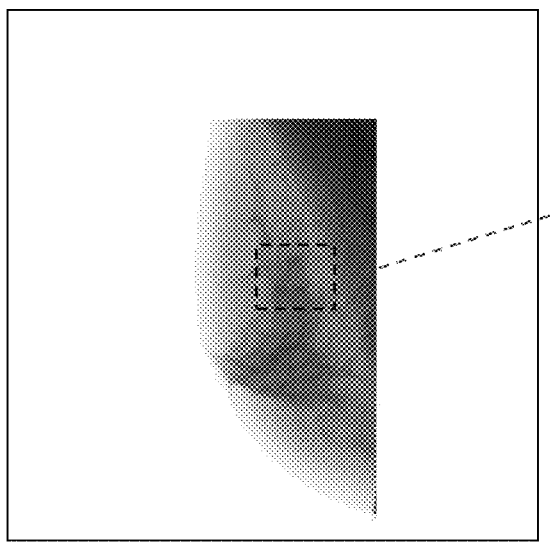
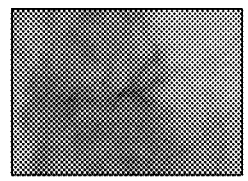
11(b)
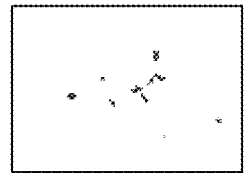
Figure 11(a)                                                      11(c)

METHOD AND SYSTEM TO DETECT THE MICROCALCIFICATIONS IN X-RAY IMAGES USING NONLINEAR ENERGY OPERATOR

FIELD OF THE INVENTION

The present invention relates to a method and apparatus to detect the microcalcifications (MC) in scanned images including X-ray images, computer tomography etc. More particularly, the present invention is directed to a method for detecting MC in X-Ray images such as mamograms with varied densities using nonlinear energy operator (NEO) to favor precise detection of early breast cancer. Microcalcifications, in mammogram are associated with both high intensity and high frequency content. The same NEO output is useful to detect the irrelevant curvilinear structures(CLS) thereby helps in reducing the false alarms in microcalcification detection technique. The proposed methodology is found to be effective on different dataset (scanned film, mammograms with large spatial resolution such as CR and DR) of varied breast composition (viz. dense, fatty glandular, fatty). It is further demonstrated quantitatively involving Free-response receiver operating characteristic (FROC). Importantly the method and apparatus of the invention can be used in conjunction with machine learning techniques viz. SVM to favour incipient or small microcalcifications and enabling early detection of breast cancer and reducing death rates. Advantageously the method and apparatus are found to benefit further radiologists for confirming detection of micro-calcifications in X-rays and the like.

BACKGROUND ART

Microcalcifications(MCs) are tiny spots of calcium deposits that can be scattered or clustered throughout the tissue as found in 2D and 3D images. Singled out MCs indicate the presence of tiny benign cysts, but their clustered appearance signify the presence of early cancer. When found on a mammogram, MCs simply indicate the presence of early breast cancer. The early delectation of MC will aid in reducing the rate of mortality in women. Hence, an adequate and robust MC detection technique is necessary to increase the performance of breast cancer diagnosis. However, identification of MC had been a challenging task to the researchers. This is due to a large variety of breast composition, highly textured breast anatomy and inherent low contrast of mammogram in spite of the recent advances of technology. Moreover MC is very small in size. In mammograms, they appear as a tiny bright spots. Along with MC, different types of breast structures (like curvilinear structures) may appear. It increases the chance of false positives in MC detection technique.

In recent periods, researchers have tried different image processing, machine learning as well as statistical approaches to single out MCs in mammogram image. Nishikawa et al. (1995) introduced a difference technique to enhance MC followed by morphological erosion to reduce false positives. In difference technique approach two consecutive filters are introduced; one for enhancing the MCs and the later for suppressing them [Nishikawa, R. M., Giger, M. L., K. D. C. J. V., and Schmidt, R. A., "Computer-aided detection of clustered micro-calcifications on digital mammograms", Medical and Biological Engineering and Computing, Springer Berlin/Heidelberg, 1994, pp. 174-178]. Chang et al. (1998) proposed a fuzzy logic based MC detection approach followed by curvilinear structure removal using curve detector to reduce false positive percentages [Cheng, H, Y. M. L., and Freimanis, R. I., "A Novel Approach to Micro-calcification Detection Using Fuzzy Logic Technique," IEEE Transactions on Medical Imaging vol. 17, issue 3, 1998, pp. 442-450]. Gurcan et al. (1999) presented nonlinear sub band decomposition technique for MC detection [Gurcan, M. N., Y. Y. and cetin, A. E., "Micro-calcification segmentation and mammogram image enhancement using nonlinear filtering", Proceedings of the IEEE-EURASIP Workshop on Nonlinear Signal and Image Processing (NSIP'99), Antalya, Turkey, 1999, June 20-23]. Melloul et al. (2002) developed an entropy thresholding based approach for MC detection. In this two stage technique, multi-scale morphological operation is initially introduced for removing background tissue followed by entropy thresholding based on 3D co-occurrence matrix for locating MCs [Melloul, M. and Joskowicz, L. "Segmentation of microcalcification in X-ray mammograms using entropy thresholding", Technical report, In Proceedings of the 16th International Congress on Computer-Assisted Radiology and Surgery, 2002]. Naga et al. (2002) demonstrated that classification efficiency could be farther improved by applying successive enhancement learning based support vector machine approach (SVM-SEL) [Naga, I., Yang, Y., Wernick, M. N., Galatsanos, N. P., and Nishikawa, R. M., "A Support Vector Machine Approach for Detection of Microcalcifications", IEEE Trans. on Med. Imaging, vol. 21, December 2002, pp. 1552- 1563]. Guan et al. (2008) introduced scale invariant feature transform (SIFT) to locate MCs [Guan, Q., Zhang, J., S. C. and Todd-Pokropeka, A., "Automatic Segmentation of Micro-calcification Based on SIFT in Mammograms", BMEI '08: Proceedings of the 2008 International Conference on Biomedical Engineering and Informatics', IEEE Computer Society, Washington, DC, USA, 2008, pp. 13-17]. Normalized Tsallis entropy and Type II fuzzy set technique has been introduced by Mohanalin et al (2009) in MC detection [Mohanalin, J., P. K. K. and Kumar, N., "Micro-calcification Segmentation Using Normalized Tsallis Entropy: An Automatic "q" Calculation by Exploiting Type II Fuzzy Sets," IETE Journal of Research, vol. 55, 2009, pp. 90-96]. According to literature, the machine learning based MC detection method seems to achieve the best accuracy [Jinshan, T., Rangayyan, R. M., Jun, X., El Naga, I., and Yongyi, Y.; "Computer-Aided Detection and Diagnosis of Breast Cancer with Mammography: Recent Advances", IEEE Trans. on Information Technology in Biomedicine, 2009, pp. 236-251].

Along with MC detection, different types of breast structures (like curvilinear structures) may appear as false positives. In literature, curve detector [2], phase congruency [Linguraru, M. G., Marias, K., Ruth, E., and Brady, M., "A biologically inspired algorithm for micro-calcification cluster detection", Medical Image Analysis Elsevier, vol. 10, Issue 6, pp. 850-862, December 2006] etc. has been tried out for curvilinear structure removal. It enhances the quality of MC detection algorithm.

There has been thus a need in the art to developing a method and apparatus for MC detection in 2D and 3D with a background of large variety of breast composition with highly textured breast anatomy and inherent low contrast of mammogram, ensuring very high true positive(TP) and low false positive(FP) simultaneously in the detection process. In the present work, a novel and automated MC detection technique based on Nonlinear Energy Operator (NEO) is presented after breast region segmentation. The same NEO output will help in curvilinear structure removal.

OBJECTS OF THE INVENTION

It is thus the basic object of the present invention to provide for a method and apparatus for low cost, precise and more reliable detection of microcalcification (MC) in X-ray images including 2D and 3D using non linear energy operator(NEO).

A further object of the present invention is directed to a method and apparatus for detection of microcalcification (MC) as symptom of early stage of breast cancer for variety of breast composition including highly textured breast anatomy overcoming the limitations of low contrast of mammogram especially with varied densities.

A still further object of the present invention is directed to a method and apparatus for detection of microcalcification (MC) adapted to reduce chance of miss and false positives (FP) and ensure very high true positive (TP) in MC detection.

A still further object of the present invention is directed to a method and apparatus for detection of microcalcification (MC) wherein said method is capable of highlighting incipient MC.

A still further object of the present invention is directed to a method and apparatus for detection of microcalcification (MC) wherein the same NEO output of the image can help in curvilinear structure(CLS) removal for further refining of the results.

A still further object of the present invention is directed to a method and apparatus for detection of microcalcification (MC) wherein NEO in conjunction with SVM based learning method can be applied to further reduce the FP while maintaining high TP fraction.

A still further object of the present invention is directed to a method and apparatus for detection of microcalcification (MC) wherein a MC identification algorithm is implemented in real time software which can reduce FP fraction without sacrificing high TP fraction.

SUMMARY OF THE INVENTION

The basic aspect of the present invention is thus directed to a method to detect the microcalcifications(MC) in images/mammograms comprising the steps of
a preprocessing step comprising eliminating all extraneous/non-breast artifacts including human introduced labels, radiopaque artifacts followed by down sampling the image/mammograms to reduce computational complexity;
a microcalcification segmentation step involving Nonlinear Energy Operator (NEO) based microcalcification segmentation comprising (a) generating smoothed Nonlinear Energy Operator (SNEO) for enhancing microcalcification spikes and (b) optimal threshold selection for detecting suspicious regions;
a false positive reduction step comprising removal of curvilinear structure texture appearances of image/mammogram based on the nonlinear energy operator to enhance computational speed and the quality of microcalcifications (MC) detection.

A further aspect of the present invention is directed to said method wherein non-linear energy operator(NEO) based microcalcification segmentation step comprises (i) pre emphasize the calcification spikes in row as well as in column directions in 2D image and/or in three axis directions for 3D image and generate said smoothed Nonlinear Energy Operator (SNEO); and (ii) determine the spike positions by applying the optimal threshold locally for each row and column separately.

A still further aspect of the present invention is directed to said method, wherein said step of pre emphasizing calcification spikes comprising (i) non linear operations on the signal known as Non Linear Energy Operator(NEO) using simply three neighbouring samples of signal to calculate its energy given by $$\phi[x(n)] = x(n)^2 - x(n-1)x(n+1) \quad (1)$$

where x(n) is a simple one dimensional signal and $\phi[x(n)]$ is energy output, and wherein output of NEO is the instantaneous energy of high pass filtered version of signal; and (ii) introducing a smoothing function preferably window function with NEO to improve the negative terms present in energy signal followed by repeated convolution of non linear energy operator with smoothing function to yield said smoothed non linear energy operator(SNEO), given by $$\phi'[x(n)] = \phi[x(n)] \otimes w(n) \quad (2)$$

where w(n) is the window function and applying SNEO independently to rows and to columns of an image, two energy images are obtained for both row and column directions whereby SNEO highlights the high frequency and high amplitude content of signal with the instantaneous nature of SNEO enhancing the MC spikes.

A still further aspect of the present invention is directed to said method, wherein energy based thresholding is applied to individual rows(or columns) of the energy image to obtain the optimal threshold for detecting suspicious regions where the Information gain due to the partitioning of a row or a column A of an energy image having entropy E(A) into two groups, the background ($A_1$) and the foreground ($A_2$) pixels, by any energy intensity level T between the maximum and minimum energy intensity levels of A, and wherein size of group $A_1$ and $A_2$ is adjusted by changing the value T from minimum level to maximum level of A, computing background entropy $E_T(A_1)$ and foreground entropy $E_T(A_2)$ for the groups $A_1$ and $A_2$, said gain denoted by $$\text{Gain}(T) = E(A) - \sum_{k=1}^{2} \left(\frac{N_k}{N}\right) * E_T(A_k) \quad (3)$$

where, $N_k$, k=1,2 are the pixel count of foreground or background respectively and N is the total pixel of A, and according to information theory, the optimal threshold is obtained as the value of T that yields the maximum Gain(T)

Yet another aspect of the present invention is directed to said method, wherein any row or column(A) of an energy image is binarized with calcification area as foreground, said binarization operation executed independently for all row and columns, placing said binarized individual rows (or columns) in chronological order of row (or column) to form a binarized image, denoted by $B_{row}$ (or $B_{col}$) and performing Boolean addition between these binarized images to achieve the final image/result.

A still further aspect of the present invention is directed to said method, wherein said step of false positive reduction comprising removal of curvilinear structure texture appearances of image/mammogram based on the nonlinear energy operator comprises introducing a parameter Φ to detect the CLS elements, given by $$\Phi = \frac{\text{Area of individual element in reduced threshold}}{\text{Area of a individual element in full threshold}} \quad (4)$$

reducing the average threshold $T_{avg}$ to p % of average threshold (where p<100), calculating Φ of each element, and if Φ is lower than certain threshold (say $T_\Phi$), object is likely to be calcification as its compactness is high and elements having higher Φ are treated as CLS elements and thus discarded.

Importantly, in said method, simultaneous presence of peaks in both the row and column and/or depth for 3D images indicates the presence of MC.

According to a preferred aspect of the present invention directed to said method wherein said images/ /mammograms include scanned film images, X-Ray, mammograms, computer tomography 2D or 3D of different types used to detect the microcalcifications(MC).

A further aspect of the present invention is directed to a method of early detection of breast cancer comprising:
(A) obtaining images/mammogram of the subject;
(B) carrying out microcalcification detection in said image/ mammogram comprising the steps of
a preprocessing step comprising eliminating all extraneous/ non-breast artifacts including human introduced labels, radiopaque artifacts followed by down sampling the image/mammograms to reduce computational complexity;
a microcalcification segmentation step involving Nonlinear Energy Operator (NEO) based microcalcification segmentation comprising (a) generating smoothed Nonlinear Energy Operator (SNEO) for enhancing microcalcification spikes and (b) optimal threshold selection for detecting suspicious regions;
a false positive reduction step comprising removal of curvilinear structure texture appearances of image/mammogram based on the nonlinear energy operator to enhance computational speed and the quality of microcalcifications (MC) detection and thus early signs of breast cancer.

A still further aspect of the present invention is directed to a system to detect the microcalcifications (MC) in images/ mammograms following the above said method comprises
means for preprocessing the images/mammograms to eliminate all extraneous/non-breast artifacts including human introduced labels, radiopaque artifacts
means for down sampling the image/mammograms to reduce computational complexity;
means for microcalcification segmentation involving Nonlinear Energy Operator (NEO) based microcalcification segmentation adapted to (a) generate smoothed Nonlinear Energy Operator (SNEO) for enhancing microcalcification spikes and (b) selecting optimal threshold for detecting suspicious regions;
means for reducing false positive comprising means adapted for removal of curvilinear structure texture appearances of image/mammogram based on the nonlinear energy operator thereby enhance computational speed and the quality of microcalcifications(MC) detection.

A still further aspect of the present invention is directed to said system to detect the microcalcifications(MC) in images/ mammograms comprising computer aided diagonistic (CAD) system adapted for
(i) preprocessing the images/mammograms (ii) down sampling the image/mammograms
(iii) microcalcification segmentation (iv) reducing false positive and (v) generating images specifying/highlighting location of the microcalcification.

The objects and advantages of the present invention are described with reference to the following accompanying illustrative figures.

BRIEF DESCRIPTION OF THE ACCOMPANYING FIGURES

FIG. 1: is the illustration of the Block Diagram of Proposed MC detection Technique.

Figure 2A:
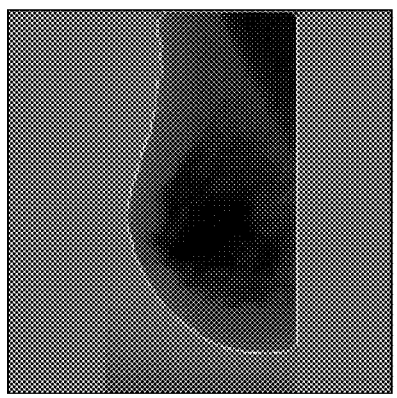
Figure 2B:
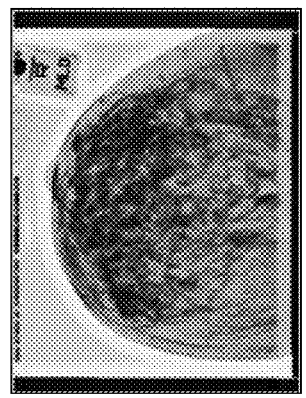
Figure 2C:
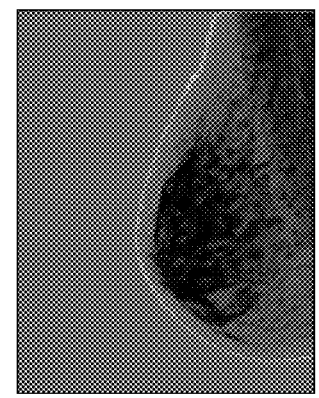
Figure 9A:
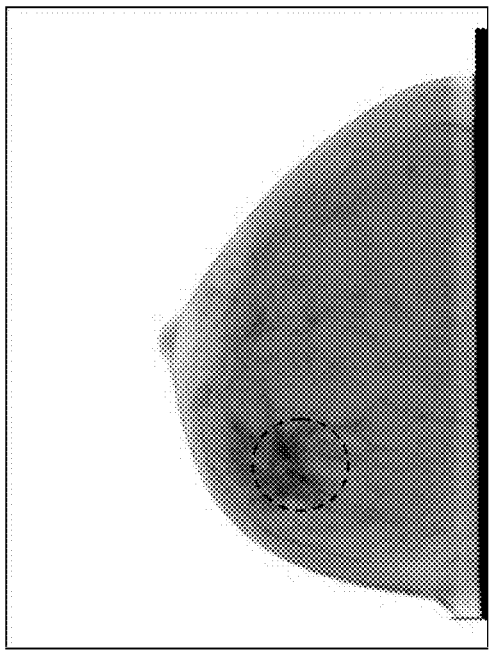
Figure 9B:
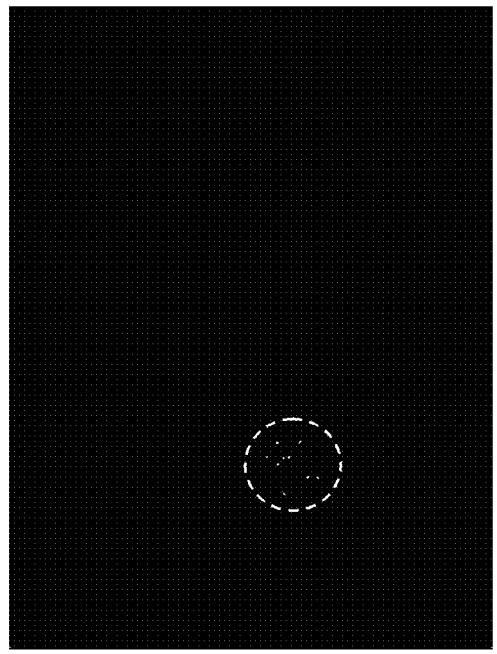
Figure 9C:
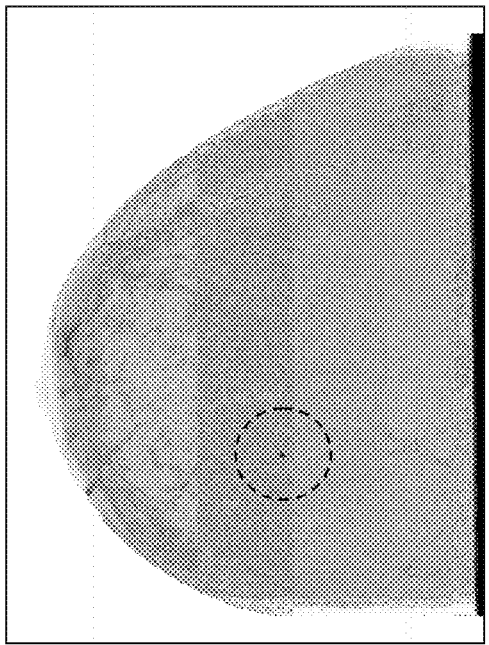
Figure 9D:
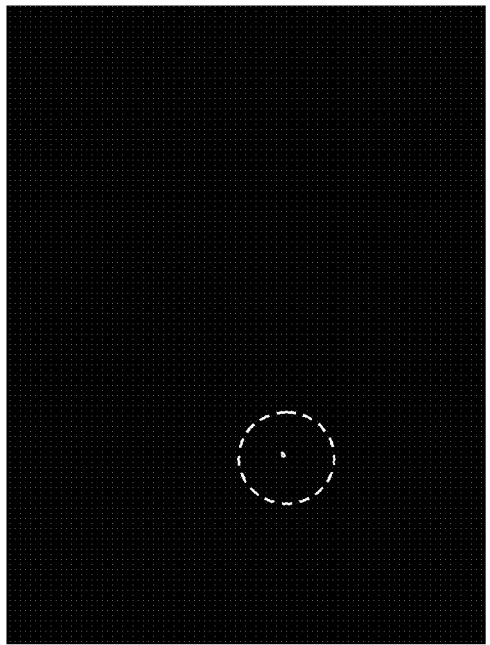

FIG. 2: illustrates the results of SBS on varied mammograms like (a) Scanned Film, (b) Computed Radiography & (c) Direct Radiography.

FIG. 3: illustrates (a) Input mammogram. (b) closer look of the ROI: Intensity profile of (c) 614th column, (d) 450th row of the input image wherein Micro-calcification (MC) is marked in red 'O'.

FIG. 4: illustrates (a) Input breast region segmented mammogram and (b) image ROI containing MCs (marked in red rectangle). (c) & (d) Energy images obtained by applying NEO independently on image row and column direction respectively on ROI image.

FIG. 5: illustrates (a) Input image; (b) image ROI and (c) x directional NEO output of ROI. Intensity profile of (d) $614^{th}$ column and (e) $450^{th}$ row of ROI image. (f & g) Output of NEO after applying on intensity profile of $614^{th}$ column and $450^{th}$ row of image respectively. Calcification spike is marked in red 'O'.

FIG. 6: illustrates (a) Input breast region segmented mammogram; (b) ROI containing micro-calcifications (marked in blue circle). (c) SNEO output of highlighted ROI.

FIG. 7: illustrates (a) Input breast segmented mammogram; (b) ROI containing MC (marked in blue circle). (c) Output of highlighted after removing curvilinear structures FIG. 8: illustrates DR mammograms of (a) dense and (c) fatty type. Micro-calcification segmented images obtained by proposed technique are shown in (b) and (d) for the image (a) and (c) respectively.

FIG. 9: illustrates CR mammograms of (a) dense and (c) fatty type. Micro-calcification detected images obtained by proposed technique are shown in (b) and (d) for the image (a) and (c) respectively.

FIG. 10: illustrates (a) Input fatty type scan filmed mammogram and (b) a ROI containing micro-calcifications. (c) Micro-calcification detected result obtained by proposed technique.

FIG. 11: illustrates (a) Input fatty glandular type scan filmed mammogram and (b) a ROI containing micro-calcifications. (c) Micro-calcification detected result obtained by proposed technique.

Figure 12A:
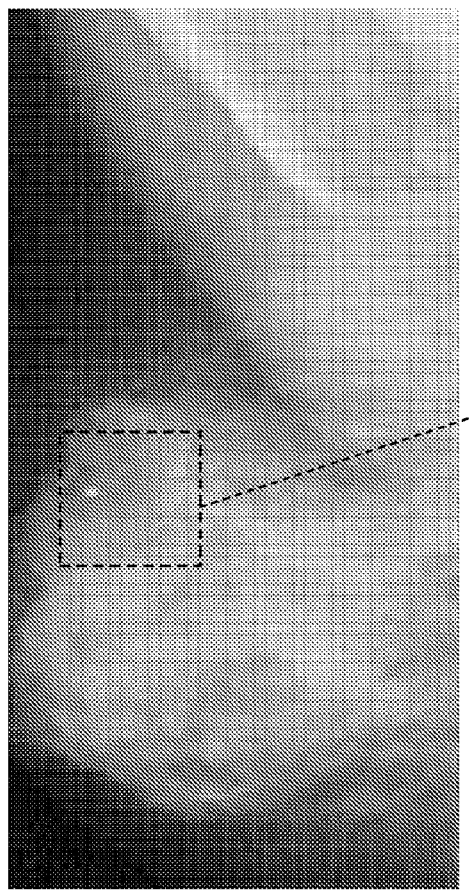
Figure 12B:
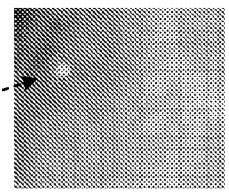
Figure 12C:
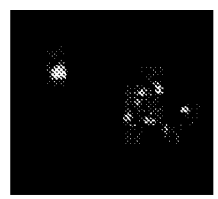

FIG. 12: illustrates (a) Input dense type scan filmed mammogram and (b) a ROI containing micro-calcifications. (c) Micro-calcification detected result obtained by proposed technique.

Figure 13A:
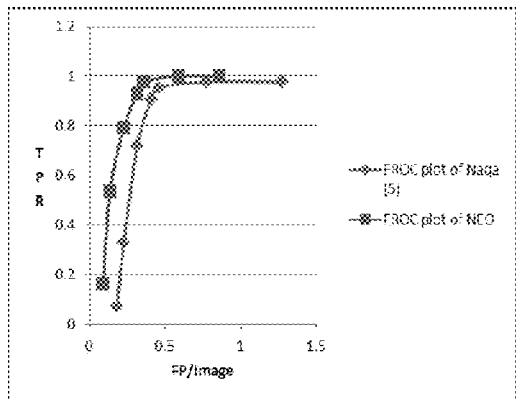
Figure 13B:
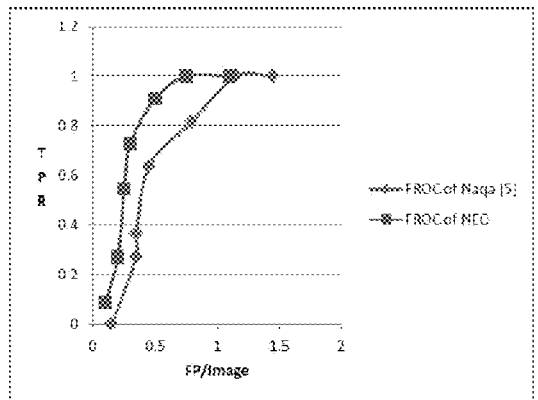
Figure 13C:
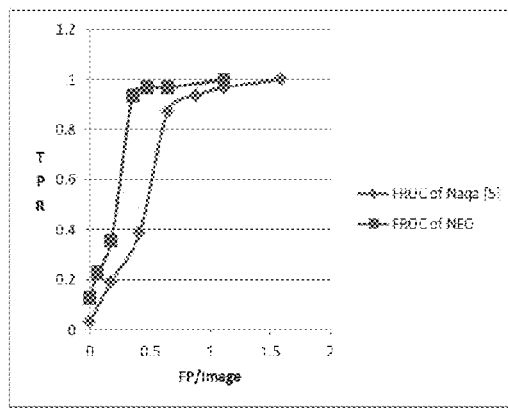

FIG. 13: illustrates Object cluster based FROC plot of NEO and SVM-SEL method [5] applied on (a) Mini-MIAS, (b) CR, and (c) DR Dataset.

Figure 14:
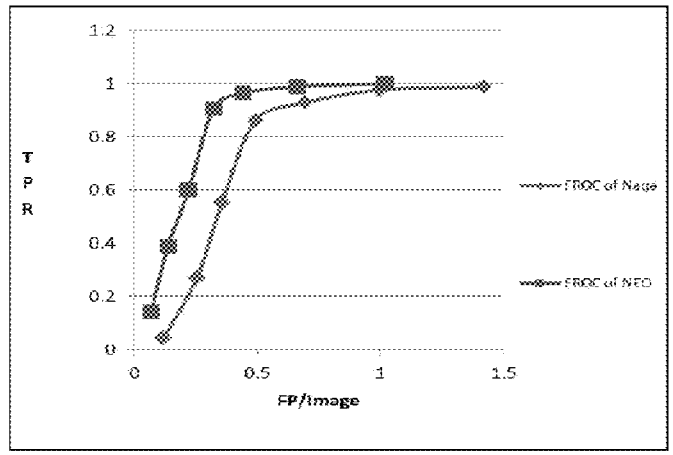

FIG. 14: Object cluster based FROC plot of NEO and SVM-SEL method by Naqa et al [5] applied on all dataset.

Figures 15A, 15B:
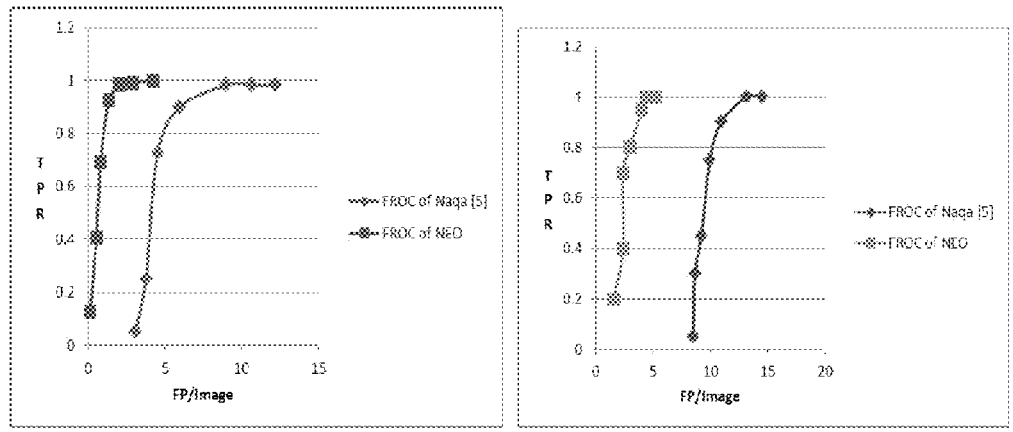
Figure 15C:
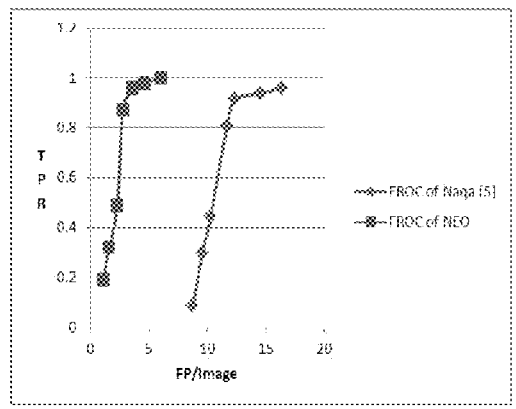

FIG. 15: illustrates Object based FROC plot of NEO and SVM-SEL method [5] applied on (a) Mini-MIAS, (b) CR, and (c) DR Dataset.

Figure 16:
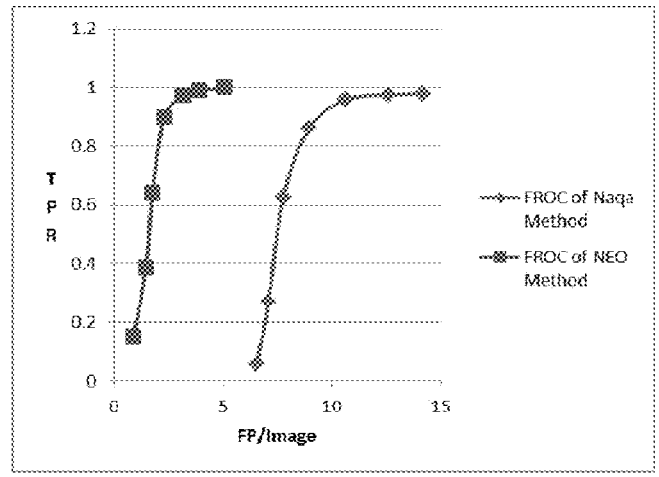

FIG. 16: illustrates Object based FROC plot of NEO and SVM-SEL method by Naga et al [5] applied on all dataset.

Figure 17A:
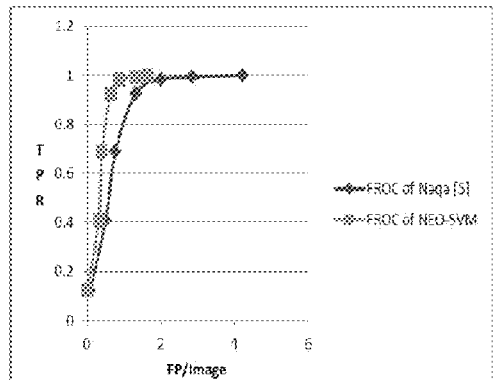
Figure 17B:
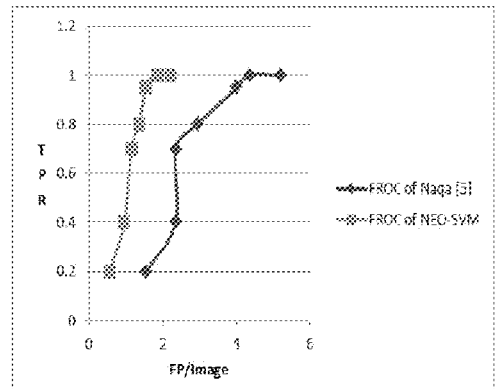
Figure 17C:
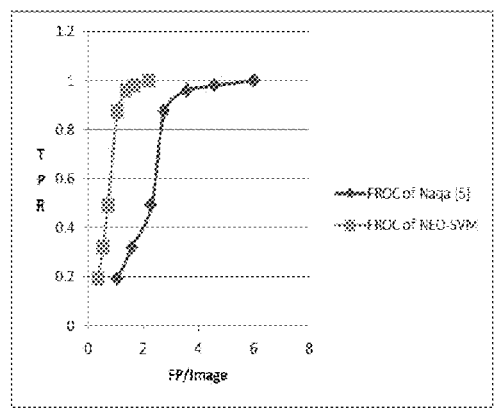
Figure 18:
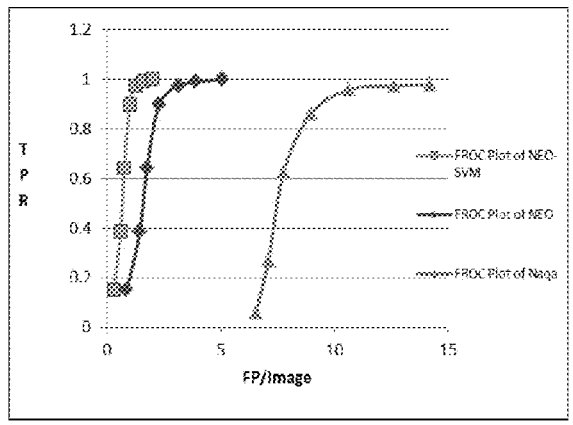

FIG. 17: illustrates Object based FROC plot of NEO-SVM and SVM-SEL method by Naga et al [5] applied on (a) Mini-MIAS, (b) CR, and (c) DR Dataset FIG. 18: object based FROC plot of NEO, SVM-SEL by Naga [5] and NEO-SVM applied on all dataset.

Figure 19A:
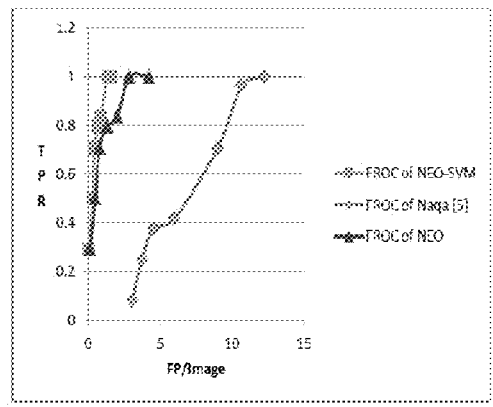
Figure 19B:
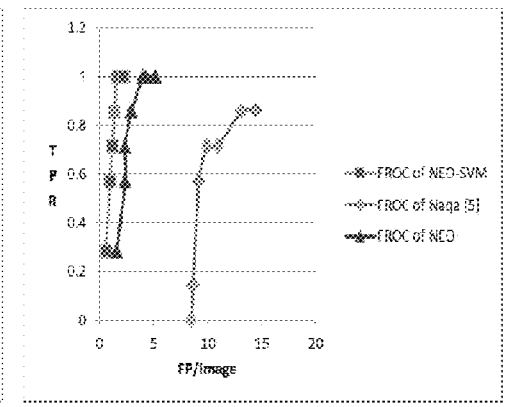
Figure 19C:
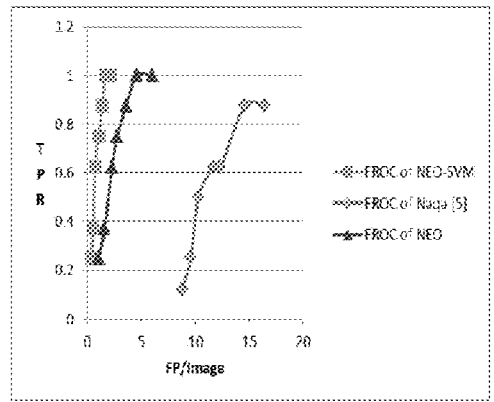

FIG. 19: illustrates object based FROC plot of NEO-SVM and SVM-SEL by Naga [5] method for small MC structures applied on (a) Mini-MIAS, (b) CR, and (c) DR Dataset.

Figure 20:
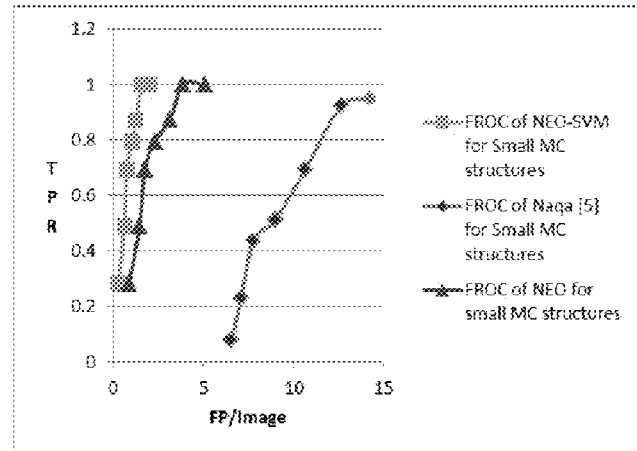

FIG. 20: illustrates object based FROC plot of NEO-SVM and SVM-SEL by Naga [5] method for small MC structures applied on all dataset.

DETAILED DESCRIPTION OF THE INVENTION WITH REFERENCE TO THE ACCOMPANYING FIGURES

The present invention relates to a method and apparatus to detect the microcalcifications (MC) in X-ray images e.g. MC in mammograms with varied densities using nonlinear energy operator (NEO) to favor precise detection of early breast cancer.

Microcalcifications (MC) are tiny spots of calcium deposits that can be scattered or clustered throughout the tissues as found in 2D and 3D images. When found on a mammogram, MCs simply indicate the presence of early breast cancer. Their early detection will aid in reducing mortality rates. However identification of MC is a challenging task to the researchers due to very small size of MC with a background of large variety of breast composition, highly textured breast anatomy and inherent low contrast of mammogram. Along with MC, different types of breast structures (like curvilinear-structures) may appear. It increases the chance of miss and false positives (FP) in MC detection. We have devised a new technique to identify the MCs with very high true positive (TP) and low false positive (FP) simultaneously.

The present invention is directed to developing a new method to detect MC using nonlinear energy operator (NEO) wherein Binarized output of NEO (based on optimal threshold) signifies the presence of MC. If both row and column wise NEO indicates presence of peak, it is a probable MC candidate in 2D images. For 3D images NEO has to be applied in all the three axes. The threshold selection is data driven (using entropy gain). The same NEO output of the image can help in curvilinear structure (CLS) removal. Importantly, using machine learning technique (viz. SVM) in conjunction with NEO based detection, the FP can be further reduced while maintaining high TP fraction. Proposed technique is capable of highlighting incipient MC.

The method of detection of MC involves nonlinear energy operator (NEO) for MC enhancement in digital X-ray image. Probable MC candidates are detected from NEO output of each row and column (and depth for 3D images) using data driven optimal (information gain based) threshold. Simultaneous presence of peaks in both the row and column (and depth for 3D images) indicates the presence of MC. The same NEO output helps to refine the result by CLS removal. Machine learning is used in conjunction with NEO leading to more refinement of the result (with less FP and high TP). Advantageously, The method of MC detection using NEO and machine learning aided NEO technique are more efficient in detecting incipient or small microcalcifications.

Microcalcification Detection

The present invention is directed to developing an algorithm to detect MC in mammograms with varied densities. The algorithm includes three major steps; preprocessing, segmentation and false positive reduction. In preprocessing stage, all non-breast artifacts (like human introduced labels, radiopaque artifacts) are eliminated followed by down sampling the mammograms to reduce computational complexity. In the following step a novel segmentation algorithm, Non-linear Energy Operator (NEO) is introduced to single out the suspicious regions for further analysis. Finally, NEO is efficiently reused to exclude the irrelevant curvilinear structures to enhance the quality of detection.

Reference is first invited to the accompanying FIG. 1 which is the flow chart showing the steps involved in the MC detection method according to the present invention involving the steps of pre-processing, segmentation and elimination of irrelevant curvilinear structures have been illustrated.

Preprocessing

Automated analysis of mammograms may be affected by the presence of human introduced labels and radiopaque artifacts present in non-breast regions. Thus, in order to limit the search for abnormal findings within the breast region, mammogram segmentation is a necessary step as preprocessing. The approach adopted to segment the breast region in the present invention is named Shape-based Breast Segmentation (SBS) as shown in accompanying Figure known in the existing art [Seth, S., Mukhopadhyay, S., Das, P., and Bhattyacharyay, P., "Shape-based Breast Segmentation in Mammograms", IETE Journal of Research, likely Issue Mar-April 2011. (Accepted)]. Moreover to reduce the computational complexity, mammograms with large spatial resolution (viz. CR and DR) are down sampled.

Non-linear Energy Operator Based Microcalcification Segmentation

MCs are very tiny high intensity spots appear in mammograms. It shows spike like behavior in both the directions of mammogram (in row as well as in column direction). Accompanying FIG. 3 illustrates spike like nature of MCs in both the directions.

Due to its spike like nature, problem of microcalcification segmentation is reduced to detection of peak in two dimensions. In literature, different peak detection algorithms have been tried out. Approximately, they can be partitioned into two steps; First stage is to pre-emphasize the calcification spikes in both the directions (in row as well as in column directions) and in later stage determine the spike positions by applying the suitable threshold locally (for each row and column separately).

Pre-emphasizing calcification spikes

Kaiser et al. (1990) has derived the expression for energy of a signal in light of an algorithm known as Teager's algorithm [Kaiser, J. F., "On a simple algorithm to calculate the energy of a signal," in Proc. IEEE Int. Conf. Acoustic Speech and Signal Processing, Albuquerque, NM, pp. 381-384, Apr. 1990.]. The algorithm uses simply three neighbouring samples of signal to calculate its energy.

$$\phi[x(n)] = x(n)^2 - (n-1)x(n+1) \quad (1)$$

where $x(n)$ is a simple one dimensional signal and $\phi[x(n)]$ is energy output. A close look at the algorithm shows that it involves nonlinear operations on the signal shortly known as NEO, Nonlinear Energy Operator. Output of NEO is the instantaneous energy of high pass filtered version of signal. This instantaneous nature of NEO is perfect for detection of transient part of signal [Mukhopadhyay, S., and Ray, G. C, "A New Interpretation of Nonlinear Energy Operator and Its Efficacy in Spike Detection", IEEE Transactions on Biomedical Engineering, vol. 45, No. 2, February 1998].

A smoothing function (such as Bartlett window function) is introduced with NEO to improve the negative terms present in Teager's energy signal. Repeated convolution of Teager's nonlinear energy operator with smoothing function yields smoothed Nonlinear Energy Operator (SNEO).

$$\phi'[x(n)] = \phi[x(n)] \otimes x(n) \quad (2)$$

where $w(n)$ is the window function. Based on best simulation results, the window function of width 5 is selected in this work. By applying $\phi'[x(n)] = \phi[x(n)] \otimes w(n)$ (2 independently to rows and to columns of an image, two energy images can be obtained for both row and column directions. Accompanying FIG. 4 illustrates the results after applying SNEO on a mammogram independently on both the directions.

It can be shown that SNEO is appropriate in highlighting the high frequency and amplitude content of signal as illustrated in accompanying FIG. 5. This instantaneous nature of SNEO is helpful in enhancing the MC spikes.

Optimal Threshold Selection for Detecting Suspicious Regions

Entropy based thresholding method is applied to individual rows (or columns) of the energy image to obtain the optimal threshold. Let any row (or column) of an energy image be A and its entropy be E (A). T is any energy intensity level between the maximum and minimum energy intensity levels of A. This T divides A in two groups; the background ($A_1$) and the foreground ($A_2$) pixels. The size of group $A_1$ and $A_2$ is adjusted by changing the value T from minimum level to maximum level of A. Background entropy $E_T(A_1)$ and foreground entropy $E_T(A_2)$ are computed for the groups $A_1$ and $A_2$. The Information gain due to the partitioning of A is denoted by;

$$\text{Gain}(T) = E(A) - \sum_{k=1}^{2} \left(\frac{N_k}{N}\right) * E_T(A_k) \quad (3)$$

where, $N_k$, k=1,2 are the pixel count of foreground or background respectively and N is the total pixel of A. According to information theory, the optimal threshold is the value of T that yields the maximum Gain(T) [T. Mitchell, Machine Learning, Tata McGraw Hill, 3rd Chap., ISE Editions, pp. 57-59, 1997].

Using this optimal threshold level the A is binarized with calcification probable area as foreground. This binarization operation is executed independently for all row and columns. Obtained binarized individual rows (or columns) are placed in chronological order of row (or column) to form a binarized image, denoted by $B_{row}$ (or $B_{col}$). Final result is achieved by performing Boolean addition between these binarized images. Still the obtained image contains a few non calcification regions mainly caused by curvilinear structures of mammogram. Accompanying FIG. 6 shows the above results.

False Positive reduction

Presence of curvilinear structures (CLS) causes textured appearance of mammogram. It gives rise to False Positive (FP) percentage of any micro-calcification segmentation algorithm. Hence CLS removal is a vital post processing step for False Positive (FP) reduction. Different types of algorithms like curve detector [2], phase congruency [9] etc. have been used for curvilinear structure removal. Implementing these algorithms for curvilinear structure removal will increase over all computation time of the micro-calcification segmentation algorithm. Hence, a novel approach of curvilinear structure removal based on nonlinear energy operator itself is introduced in this paper which increases computational speed of the technique.

After applying NEO based MC segmentation, each segmented elements (or objects) are treated independently. To detect the CLS elements, a parameter $\Phi$ is introduced.

$$\Phi = \frac{\text{Area of individual element in reduced threshold}}{\text{Area of a individual element in full threshold}} \quad (4)$$

Reducing the average threshold $T_{avg}$ to p % of average threshold (where p<100), $\Phi$ of each element is calculated. If $\Phi$ is lower than certain threshold (say $T_\Phi$), object is likely to be calcification as its compactness is high. Elements having higher $\Phi$ are treated as CLS elements and thus discarded. CLS removed images are shown in accompanying FIG. 7.

Dataset Preparation & Machine Configuration:

The proposed MC detection technique is developed using a dataset obtained from varied sources. From Mini-MIAS dataset 22 (7 fatty, 8 fatty glandular and 7 dense glandular) with MC present and 15 (6 fatty, 5 fatty glandular and 4 dense glandular) with normal mammograms are added to the simulation dataset (refer FIGS. 10(a), 11(a), and 12(a)). These are 8 bit images with size of 1 M pals (1024×1024). From KODAK DirectView CR 850 system 20 (6 fatty and 14 dense glandular) with MC present and 10 (5 fatty and 5 dense glandular) with normal CR mammograms are added to the database (refer FIG. 9(a)). These are 12 bit images of size 4 M pals (2392×1792). From MAMMOMAT NovationDR, Siemens, 17 (11 fatty and 6 dense glandular) with MC present and 10 (5 fatty and 5 dense glandular) with normal mammograms of DR type are added to the database (refer FIG. 8(a)). Sizes of these 12 bit images are 8 M pals (2560×3328). Dataset used in this work is presented in following Table 1.

TABLE 1

| | | Dataset description | | | | |
|---|---|---|---|---|---|---|
| | Total | Based on breast composition | | | Based on findings | |
| Image Type | Number of images | Fatty | Fatty Glandular | Dense Glandular | Normal images | Images with MC |
| Scanned Film | 37 | 13 | 13 | 11 | 15 | 22 |
| CR | 30 | 11 | — | 19 | 10 | 20 |
| DR | 27 | 16 | — | 11 | 10 | 17 |
| Total | 94 | 40 | 13 | 41 | 35 | 59 |

For reduction of processing time, CR and DR images are down sampled in each direction by a factor of 2 and 4 respectively. This will reduce the CR mammogram resolution to 0.194 mm per pixel and DR mammograms resolution to 0.28 mm per pixel. Original MIAS dataset has already been reduced to 0.2 mm per pixel and named Mini-MIAS dataset. Microcalcifications are manually drawn to prepare the ground truth for CR and DR images. These are confirmed by radiologist (refer FIG. 8, 9). For Mini-MIAS, ground truth of microcalcifications is provided along with the dataset (refer FIGS. 10, 11, and 12). The simulation is performed in IBM PC with Pentium4 processor (3GHz), 1GB RAM, Windows XP (sp3) as OS and Matlab 7.6 version as the simulation platform.

Proposed NEO Based Microcalcification Detection Results

Nonlinear energy operator based micro-calcification segmentation technique is reported in this chapter. This technique also helps in removing the irrelevant curvilinear structures thereby reducing the false alarms present in mammogram. Based on best simulation result, the percentage reduction of average threshold (p) and CLS removal parameters ($T_\Phi$) are set as 75 and 15 respectively. Using this parameter values, NEO is applied on varied dataset of mammogram for micro-calcification detection.

Proposed technique is applied on DR and CR mammograms of different types (viz. dense, fatty). The results are shown in FIG. 8 and FIG. 9 respectively.

Proposed technique is applied on scanned film mammograms of different types (viz. fatty, fatty glandular and dense glandular). The results are shown in FIG. 10 to FIG. 12.

From the simulation results, it has been found that the proposed micro-calcification detection method has performed excellent for DR, CR and scan filmed mammograms irrespective of its viewing angle and density variation.

Quantitative Comparison of Microcalcification Detection Methods

Several techniques have been tried out for efficient microcalcification detection. While increasing the accuracy false alarms are increasing in alarming rate. The proposed NEO based microcalcification detection method shows supremacy over established microcalcification detection method in terms of execution time and accuracy. It can precisely detect single as well as clusters of microcalcification with minimal amount of false alarms. Object cluster detection rate of NEO based method is below 1 false positive per image without any miss for all types of dataset (viz. Mini-MIAS, CR, and DR). This has been demonstrated using free-Response Operator Characteristic (FROC) plot. With this accuracy NEO seems to be the efficient and accurate microcalcification cluster detection technique as illustrated in accompanying FIGS. 13 & 14.

For the case of single object detection, the NEO based microcalcification detection method accurately detects microcalcification with nearly 5 false positive per image without any miss for all types of dataset (viz. Mini-MIAS, CR, and DR). This has been demonstrated using FROC plot as illustrated in accompanying FIGS. 15 & 16.

Using SVM-based machine learning approach, this accuracy rate can bring under 2 false positive per image without any miss. Here, eccentricity, homogeneity and standard deviation is introduced as features to train the SVM classifier for refining the NEO outputs. Quantitative analysis is made among the microcalcification detection techniques applied on various dataset viz. Mini-MIAS, CR, and DR using FROC plot as illustrated in accompanying FIGS. 17 & 18. These results are verified and confirmed by radiologist.

The experimental result in this work has been confirmed by radiologist. The proposed technique has been tested on various dataset viz. Mini-MIAS, CR, and DR with varied size of microcalcifications ranging from 0.2 mm to 0.5 mm. The proposed method shows accurate results in case of small MC structures of size in-between 0.2 to 0.3 mm (area of maximum 2 pixels for CR and Scanned film images and area of 1 pixel for DR images). Proposed MC detection technique shows accuracy rate of 2 false positive per image without any miss. Comparison of the proposed and established Naga method [5] is described using FROC plot for the small MC structures as illustrated in accompanying FIGS. 19 and 20.

Additionally, the execution time of the proposed method is less than 3 second per image. Higher processing efficiency of the proposed technique will help the radiologist in making explicit and fast decision.

It is thus possible by way of the present invention to providing a detection method for Microcalcifications which appear as spike like tiny bright spots in X ray images. By applying a robust spike detection algorithm, these spike like microcalcifications can be figured out. Hence, a novel and automatic approach based on nonlinear energy operator (NEO) has been proposed for microcalcification detection which is extremely sensitive to transient part of signal. Mostly all the microcalcification detection techniques exist in literature undergoes an additional false positive reduction step for elimination of the irrelevant curvilinear structures. It has been shown that the same NEO output will help in microcalcification detection along with its refinement. This will results in saving computation time. The proposed method shows supremacy over established methods by accurately detecting the microcalcification clusters within 1 false alarm per image.

For the case of single microcalcification, NEO can accurately detect 5 false positives per image without any miss.

Using SVM based learning method; this result can be further refined leading to 2 false positive alarms per image without any miss. In this work, FROC curves indicate that the NEO based microcalcification detection yields the best performance when compared to several existing method. In case of incipient and small microcalcification structures detection, the proposed technique shows supremacy over existing techniques. The method and apparatus of the present invention is thus capable of providing the following advantageous features in MC detection in X-ray images:

Non linear energy operator (NEO) for MC enhancement in digital X-ray image.

Probable MC candidates are detected from NEO output of each row and column (and depth for 3D images) using data driven optimal (information gain based) threshold.

Simultaneous presence of peaks in both the row and column (and depth for 3D images) indicates the presence of MC.

The same NEO output helps to refine the result by CLS removal.

Machine learning can be used in conjunction with NEO leading to more refinement of the result (with less FP and high TP).

Proposed NEO and machine learning aided NEO technique are more efficient in detecting incipient or small microcalcifications.

We claim:

1. A method to detect microcalcifications in images or mammograms comprising: a pre-processing step comprising:
    (i) eliminating all extraneous and non-breast artifacts including human introduced labels, radiopaque artifacts; and
    (ii) down sampling the image or mammograms to reduce computational complexity;
   a microcalcification segmentation step involving Non Linear Energy Operator (NEO) output based microcalcification segmentation comprising:
    (i) generating a smoothed NEO (SNEO) for enhancing microcalcification spikes; and
    (ii) selecting an optimal threshold for detecting suspicious regions containing microcalcification; and
   a false positive reduction step comprising removing curvilinear structure (CLS) texture appearances of the images or mammograms by reusing the NEO output to enhance computational speed and the quality of microcalcification detection, wherein the false positive reduction step comprises introducing a parameter $\phi$ to detect CLS elements, wherein:

$$\phi = \frac{\text{Area of individual element in reduced threshold}}{\text{Area of a individual element in full threshold}}$$

involving the same SNEO in the microcalcification segmentation step by reducing average thereshold $T_{avg}$ which is average of local optimal threshold corresponding to each of the SNEO/NEO operated direction output to p% of the average threshold (where p<100), calculating the $\phi$ of each element, and if the $\phi$ is lower than certain threshold (say $T_\phi$), object is likely to be calcification as its compactness is high and elements having higher $\phi$ are treated as the CLS elements and thus discarded.

2. The method according to claim 1, wherein the NEO based microcalcification segmentation step comprises:

(i) pre-emphasizing the calcification spikes in row as well as in column directions in 2D image and/or in three axis directions for 3D image and generating said SNEO; and
(ii) determining the spike positions by applying the optimal threshold locally for each row and column separately.

3. The method according to claim 2, wherein said step of pre-emphasizing the calcification spikes comprises:
(i) generating energy operator output, which is the instantaneous energy of high pass filtered version of signal involving non-linear operations on the signal known as NEO using simply three neighbouring samples of signal to calculate its energy given by:

$$\phi[x(n)] = x(n)^2 - x(n-1)x(n+1) \qquad (1)$$

where x(n) is a simple one dimensional signal; and
(ii) introducing a smoothing function preferably window function with NEO to improve the negative terms present in energy signal followed by repeated convolution of NEO with smoothing function to yield said SNEO, given by:

$$\phi'[x(n)] = \phi[x(n)] \otimes w(n) \qquad (2)$$

where w(n) is the window function and applying SNEO independently to rows and to columns of an image, two energy images are obtained for both row and column directions whereby the SNEO highlights the high frequency and high amplitude content of signal with the instantaneous nature of the SNEO enhancing the microcalcification spikes.

4. The method according to claim 1, wherein energy based thresholding is applied to individual rows or columns of the energy image to obtain the optimal threshold for detecting suspicious regions where information gain due to partitioning of a row or a column A of an energy image having entropy E(A) into two groups, the background (A1) and the foreground (A2) pixels, by any energy intensity level T between the maximum and minimum energy intensity levels of A, and wherein size of group A1 and A2 is adjusted by changing the value T from minimum level to maximum level of A, computing background entropy ET (A1) and foreground entropy ET (A2) for the groups A1 and A2, said gain denoted by $$\text{Gain}(T) = E(A) - \sum_{k=1}^{2} \left(\frac{N_k}{N}\right) * E_T(A_k) \qquad (3)$$

where, Nk, k=1,2 are the pixel count of foreground or background respectively and N is the total pixel of A, and according to information theory, the optimal threshold is obtained as the value of T that yields the maximum Gain (T).

5. The method according to claim 4, wherein any row or column(A) of an energy image is binarized with calcification area as foreground, said binarization operation executed independently for all row and columns, placing said binarized individual rows or columns in chronological order of row or column to form a binarized image, denoted by Brow or Bcol and performing Boolean addition between these binarized images to achieve the final image/result.

6. The method according to claim 1, wherein simultaneous presence of peaks in both the row and column and/or depth for 3D images indicates presence of microcalcifications.

7. The method according to claim 1, wherein said images or mammograms include scanned film images, X-Ray, mammograms, computer tomography 2D or 3D of different types used to detect the microcalcification.

8. A method of early detection of microcalcifications in breast tissue comprising:
(A) obtaining images or mammograms of the subject; and
(B) carrying out microcalcification detection in said image or mammogram comprising the steps of:
a preprocessing step comprising eliminating all extraneous or non-breast artifacts including human introduced labels, radiopaque artifacts followed by down sampling the image mammograms to reduce computational complexity; a microcalcification segmentation step involving NEO based microcalcification segmentation comprising:
(a) generating a SNEO for enhancing microcalcification spikes; and
(b) optimal threshold selection for detecting suspicious regions containing microcalcification; and
a false positive reduction step comprising removing curvilinear structure texture appearances of the images or the mammograms by reusing the NEO output to enhance computational speed and the quality of microcalcification detection wherein the false positive reduction step comprises introducing a parameter φ to detect CLS elements, wherein:

$$\phi = \frac{\text{Area of individual element in reduced threshold}}{\text{Area of a individual element in full threshold}}$$

involving the same SNEO in the microcalcification segmentation step by reducing average theresnold $T_{avg}$ which is average of local optimal threshold corresponding to each of the SNEO/NEO operated direction output to p% of the average threshold (where p<100), calculating the φ of each element, and if the φ is lower than certain threshold (say $T_\phi$), object is likely to be calcification as its compactness is high and elements having higher φ are treated as the CLS elements and thus discarded.

* * * * *